US012680683B1

(12) United States Patent
Zheng

(10) Patent No.: US 12,680,683 B1
(45) Date of Patent: Jul. 14, 2026

(54) DETACHABLE TELESCOPIC DOWNLIGHT

(71) Applicant: Hangzhou Juxing Intelligent Technology Co., Ltd., Hangzhou (CN)

(72) Inventor: Hongbing Zheng, Hangzhou (CN)

(73) Assignee: Hangzhou Juxing Intelligent Technology Co., Ltd., Hangzhou (CN)

( * ) Notice: Subject to any disclaimer, the term of this patent is extended or adjusted under 35 U.S.C. 154(b) by 0 days.

(21) Appl. No.: 19/182,680

(22) Filed: Apr. 18, 2025

(30) Foreign Application Priority Data

Mar. 14, 2025 (CN) ........................ 202520450110.1

(51) Int. Cl.

| | |
|---|---|
| ***F21V 21/22*** | (2006.01) |
| ***F21S 8/02*** | (2006.01) |
| ***F21V 21/04*** | (2006.01) |

(52) U.S. Cl.
CPC .............. *F21V 21/22* (2013.01); *F21S 8/026* (2013.01); *F21V 21/04* (2013.01)

(58) Field of Classification Search
CPC ........... F21V 21/04; F21V 21/22; F21S 8/026
See application file for complete search history.

(56) References Cited

U.S. PATENT DOCUMENTS

| | | | | |
|---|---|---|---|---|
| 10,288,266 | B2 * | 5/2019 | Feit | F21S 8/026 |
| 2017/0089556 | A1 * | 3/2017 | Ticktin | F21V 29/83 |

FOREIGN PATENT DOCUMENTS

| | | | |
|---|---|---|---|
| CN | 205842574 | U * | 12/2016 |
| JP | 2016066466 | A * | 4/2016 |
| WO | WO2019010745 | A1 * | 1/2019 |

OTHER PUBLICATIONS

English translation of WO 2019010745 A1 (Year: 2019).*

* cited by examiner

*Primary Examiner* — Thien M Le
*Assistant Examiner* — April A Taylor
(74) *Attorney, Agent, or Firm* — IPRTOP LLC

(57) ABSTRACT

A detachable telescopic downlight is provided. The downlight includes a downlight body and a telescopic fixing structure. The downlight body includes a lamp panel and a lamp holder. A slot is provided on a top of the lamp panel, and a bottom of the telescopic fixing structure is detachably connected to the slot. The lamp holder is detachably mounted on a top end of the telescopic fixing structure. The present application achieves a free adjustment with stepless telescoping to ensure that the downlight can be applied to light housings of different depths, thereby providing improved stability and avoiding issues such as slippage or shifting, which may occur due to friction-based installation.

8 Claims, 5 Drawing Sheets

DETACHABLE TELESCOPIC DOWNLIGHT

CROSS-REFERENCE TO RELATED APPLICATION

The present application claims the benefit of priority to Chinese Patent Application No. 202520450110.1, entitled “DETACHABLE TELESCOPIC DOWNLIGHT”, filed with CNIPA on Mar. 14, 2025, the disclosure of which is incorporated herein by reference in its entirety for all purposes.

FIELD OF THE INVENTION

The present application relates to the technical field of lighting devices, and specifically relates to a detachable telescopic downlight.

BACKGROUND OF THE INVENTION

As a common type of indoor lighting fixture, downlights are widely used in homes, commercial places, and public buildings. The downlights are designed to be embedded into the ceiling to provide a simple and aesthetic lighting effect without occupying additional space. However, there are several issues with the existing downlight installation methods, especially in terms of installation structure and operational convenience.

Currently, the downlight installation methods on the market mainly adopt a torsion spring support structure, where the downlight is fixed to the sidewall of the light housing with the torsion spring. The installation methods, although simple in structure, expose many defects in practical applications. Firstly, the torsion spring support structure is prone to detachment due to external forces during the installation process, which prevents the downlight from being installed and increases the installation failure rate. Secondly, the torsion spring’s high elastic force poses a significant safety risk during installation and removal, as it may easily cause injury to workers. In addition, these installation methods impose high requirements on the sidewall strength and the dimensional accuracy of the light housing. Once the sidewall strength is insufficient or the dimensional deviation is large, the torsion spring may loosen easily or fail to function properly, which in turn affects the mounting effect and stability of the downlight.

In addition to the above problems, the existing downlight installation methods also present issues of complicated installation steps and inconvenient operation. For example, some downlights require pre-drilling holes in the ceiling and are mounted through complex screw fastening or spring hook structures, which not only increases installation time and labor intensity, but also places higher demands on the professional skills of the installers. In some special situations, such as installation at high places or in narrow spaces, the limitations of the installation methods become more apparent and may lead to an inefficient or even incomplete installation.

Due to the issues present in the existing downlight installation methods, some improvement solutions have emerged on the market. For example, some patents have proposed technologies that simplify the installation process through pre-buried structures or quick-installation and easy-disassembly designs. However, most of the installation methods only implement partial structural optimizations without addressing the inherent flaws of the torsion spring support structure or resolving the associated safety risks and operational inconvenience. Therefore, it is still a technical problem to be solved in the art to design a safer, more convenient, and stable downlight installation structure.

SUMMARY OF THE INVENTION

The present application provides a detachable telescopic downlight, including a downlight body and a telescopic fixing structure. The downlight body includes a lamp panel and a lamp holder. A slot is provided on a top of the lamp panel, and a bottom of the telescopic fixing structure is detachably connected to the slot. The lamp holder is detachably mounted on a top end of the telescopic fixing structure.

In one embodiment of the present application, a limiting block is provided on the top of the lamp panel, and a slide buckle is provided on the bottom of the telescopic fixing structure. The slide buckle is configured to be inserted into an entrance of the slot and to move in the slot along a first horizontal direction. When the telescopic fixing structure slides into a slot bottom plate, the telescopic fixing structure is locked to the limiting block to prevent the telescopic fixing structure from moving out of the slot in a direction opposite to the first horizontal direction.

In one embodiment of the present application, the telescopic fixing structure includes a first telescopic rod, a second telescopic rod, a bottom plate, a tension spring, and a torsion spring. The second telescopic rod is a hollow structure. A sidewall of the second telescopic rod forms a guide slide slot. The first telescopic rod is slidably sleeved in the second telescopic rod along the guide slide slot. The bottom plate is integrally or detachably disposed on a bottom of the second telescopic rod. A first end of the tension spring is fixed to the first telescopic rod, and a second end of the tension spring is fixed to the bottom plate. A first spring arm of the torsion spring is fixedly disposed on an inner sidewall of the second telescopic rod, and a second spring arm of the torsion spring is slidably disposed on a guide rail structure in the first telescopic rod.

In one embodiment of the present application, the guide rail structure is provided on an inner wall of the first telescopic rod. The guide rail structure includes a guide rail slot and the second spring arm. The guide rail slot includes a vertical guide slot and a locking slot connected to the vertical guide slot. The locking slot includes at least one locking position. The second spring arm can enter the locking position under the action of an external force and remain in the locking position after the external force is removed to adjust the overall height of the telescopic fixing structure.

In one embodiment of the present application, the guide rail structure further includes a bifurcation step. The bifurcation step is disposed at a connection between the guide slot and the locking slot to allow the torsion spring to slide along the guide rail slot.

In one embodiment of the present application, a first notch is provided on sidewalls of the first telescopic rod and the second telescopic rod in a vertical direction, so that horizontal cross sections of the sidewalls are C-shaped. A bottom platform of the second telescopic rod has a trapezoidal shape.

In one embodiment of the present application, a second notch is provided on the trapezoidal bottom platform, and the second notch of the second telescopic rod is connected to the first notch for the passage of electric wires.

In one embodiment of the present application, a first toothed structure and a first buckle are provided on an inner sidewall of a top of the telescopic fixing structure. The first toothed structure and the first buckle are respectively connected to a second toothed structure and a second buckle on an outer edge of the lamp holder.

In one embodiment of the present application, a threaded structure is disposed on the top of the telescopic fixing structure to ensure that the lamp holder can be screwed into the telescopic fixing structure.

As described above, the detachable retractable downlight of the present application has the following beneficial effects.

The detachable telescopic downlight of the present application adopts a detachable structural design of the downlight body and the telescopic structure. The detachable structure downlight can achieve a free adjustment with stepless telescoping to ensure that the downlight can be applied to light housings of different depths. Meanwhile, it also avoids issues such as slippage or shifting, which may occur due to the friction-based installation, and provides improved stability. The present application not only solves the problem where the current downlight installation method relies on a torsion spring supported on the side wall of the light housing, which leads to installation failure due to the side-wall torsion spring limiting assembly detaching from the light housing, but also addresses the installation difficulties and the risk of injury present in current installation methods. Meanwhile, the structure and components of the present application are highly versatile, with a wide range of applications.

REFERENCE NUMERALS

Figure 1:
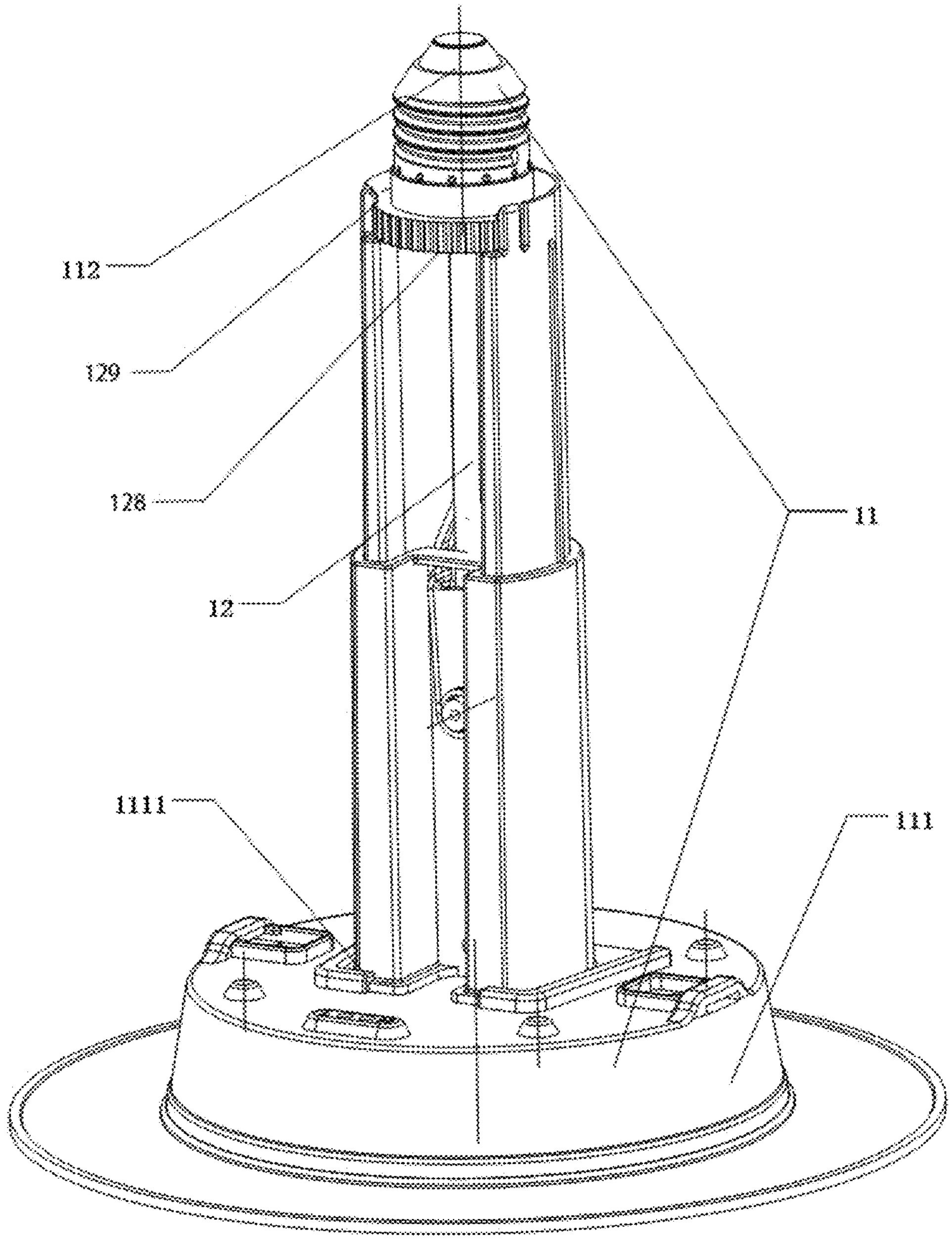
FIG. 1 is a schematic structural perspective view of a detachable telescopic downlight according to one embodiment of the present application.

11 Downlight body
12 Telescopic fixing structure
111 Lamp panel
112 Lamp holder
121 First telescopic rod
122 Second telescopic rod
123 Bottom plate
124 Tension spring
125 Torsion spring
126 Toothed structure
127 Buckle
1111 Slot
1112 Limiting block
1251 First spring arm
1252 Second spring arm
13 Guide rail structure
131 Guide rail slot
1311 Guide slot
1312 Locking slot
1313 Bifurcation step
21 First point position
22 Second point position
23 Third point position
24 Furth point position
31 First notch
32 Second notch

DETAILED DESCRIPTION

The present application is further described below with reference to the accompanying drawings, but the protection scope of the present application is not limited to the following description.

The specific embodiments are described below to illustrate the implementation of the present application, and those skilled in the art can easily understand other advantages and effects of the present application from the content disclosed in this specification. The present application can also be implemented or applied in other specific embodiments. The details provided in this description can be modified or altered in various ways based on different perspectives and applications without departing from the spirit of the present application. It should be noted that the embodiments and features of the embodiments in the present application can be combined with each other as long as there is no conflict.

The following embodiments of the present application provide a detachable telescopic downlight, which solves the technical problem of installation failure caused by the detachment of a sidewall torsion spring limiting assembly from the light housing and addresses the installation difficulties and the risk of injury present in existing installation methods.

The embodiments of the present application provide a detachable telescopic downlight, which adopts a detachable structural design of the downlight body and the telescopic structure. The detachable structure downlight achieves a free adjustment with stepless telescoping to ensure that the downlight can be applied to light housings of different depths, while avoiding issues such as slippage or shifting, which may occur due to the friction-based installation, providing improved stability. The present application not only solves the problem where the current downlight installation method relies on a torsion spring supported on the side wall of the light housing, which leads to installation failure due to the sidewall torsion spring limiting assembly detaching from the light housing, but also addresses the installation difficulties and the risk of injury present in current installation methods.

The following provides a detailed explanation of the principles and embodiments of the detachable telescopic downlight with reference to the accompanying drawings.

Figure 2:
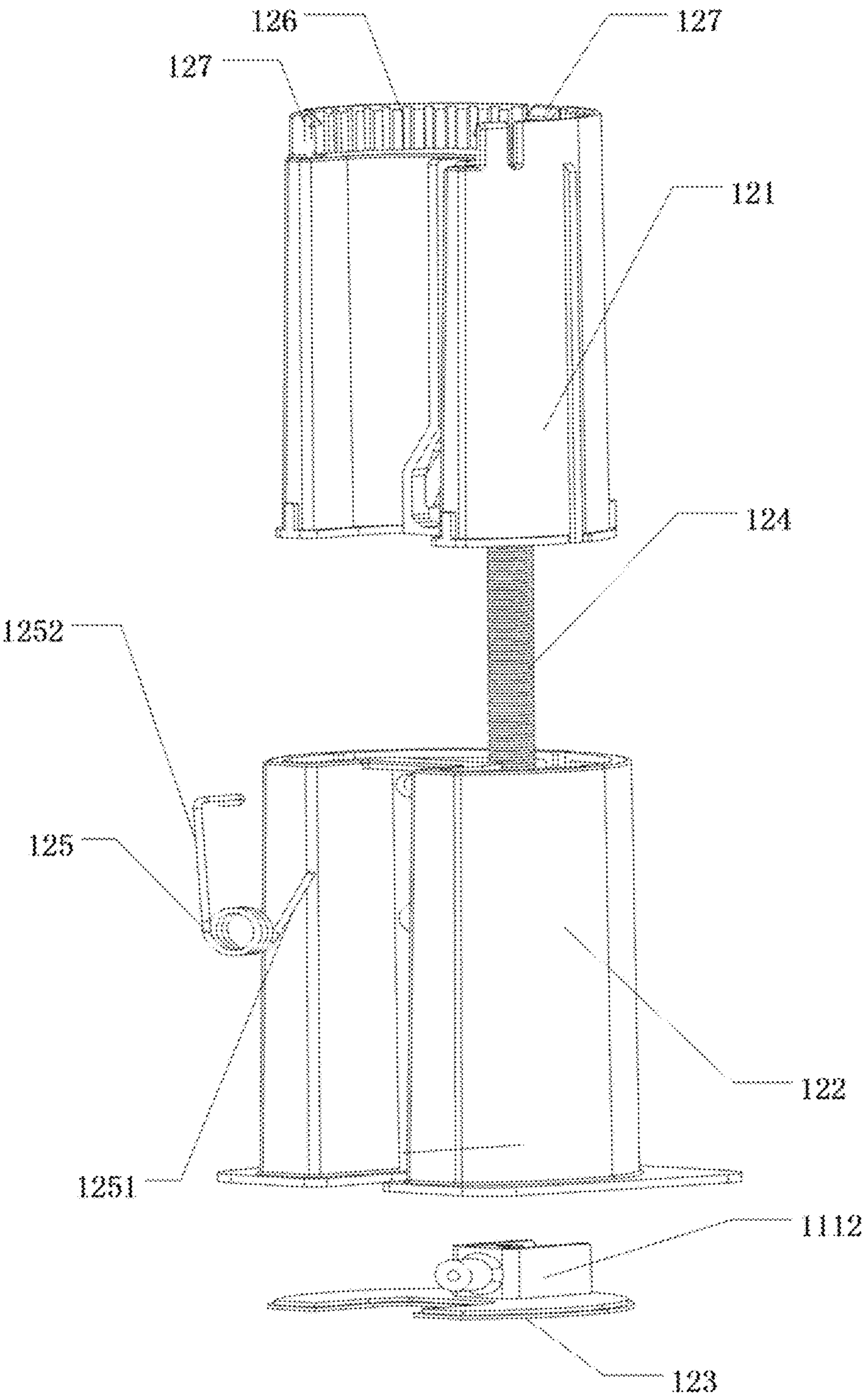
FIG. 2 is an exploded view of a telescopic fixing structure of a detachable telescopic downlight according to one embodiment of the present application.

Please refer to FIG. 1 and FIG. 2. FIG. 1 is a schematic structural perspective view of a detachable telescopic downlight according to one embodiment of the present application. FIG. 2 is an exploded view of a telescopic fixing structure of a detachable telescopic downlight according to one embodiment of the present application. As shown in FIG. 1 and FIG. 2, a detachable telescopic downlight 1 includes a downlight body 11 and a telescopic fixing structure 12.

In one embodiment, the downlight body 11 includes a lamp panel 111 and a lamp holder 112. The lamp panel 111 and the lamp holder 112 are interconnected by wires. A slot 1111 is provided on a top of the lamp panel 111, and a bottom of the telescopic fixing structure 12 is detachably connected to the slot 1111. The lamp holder 112 is detachably mounted on a top end of the telescopic fixing structure 12.

Furthermore, a limiting block 1112 is provided on the top of the lamp panel 111. A slide buckle is provided at the bottom of the telescopic fixing structure 12 to be inserted into an entrance of the slot 1111 and to move in the slot 1111 along a first horizontal direction. When the telescopic fixing structure 12 slides into a slot bottom plate, the telescopic fixing structure 12 is locked to the limiting block 1112 to prevent the telescopic fixing structure 12 from moving out of the slot in a direction opposite to the first horizontal direction. That is to say, when the telescopic fixing structure 12 is compressed to a limit position, the bottom of the telescopic fixing structure 12 is limited and fixed to the top of the lamp panel 111, and the top of the telescopic fixing structure 12 is limited and fixed to the lamp holder 112.

In this structure, the telescopic fixing structure 12 and the downlight body 11 can be snap-fit connected and disassembled. The bottom of the telescopic fixing structure 12 first contacts the top of the lamp panel 111, then is pushed forward along the slide slot until it reaches the limit position. Next, the lamp holder 112 is mounted downward from the top of the telescopic fixing structure 12 onto the telescopic fixing structure 12 until it reaches a limit position, thereby achieving a relatively stable installation of the entire ceiling plate.

Figure 3:
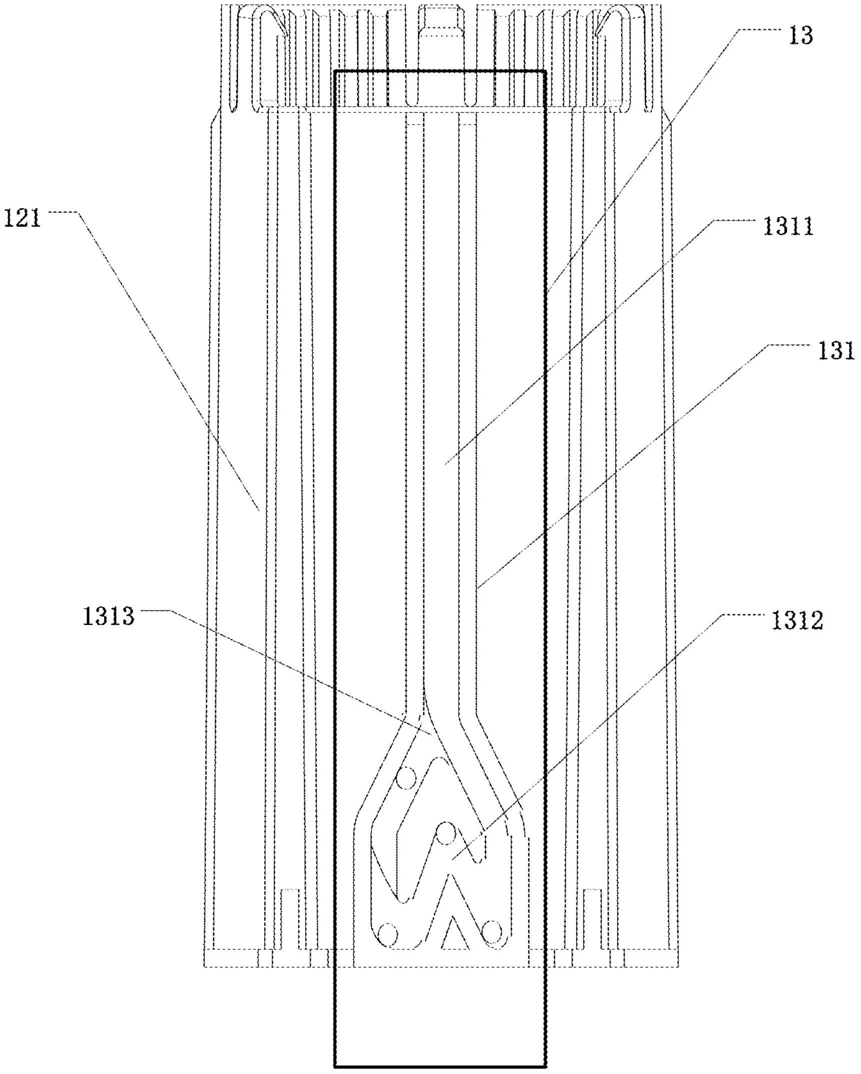
FIG. 3 is a schematic diagram of a guide rail structure of a first telescopic rod of a detachable telescopic downlight according to one embodiment of the present application.
Figure 4:
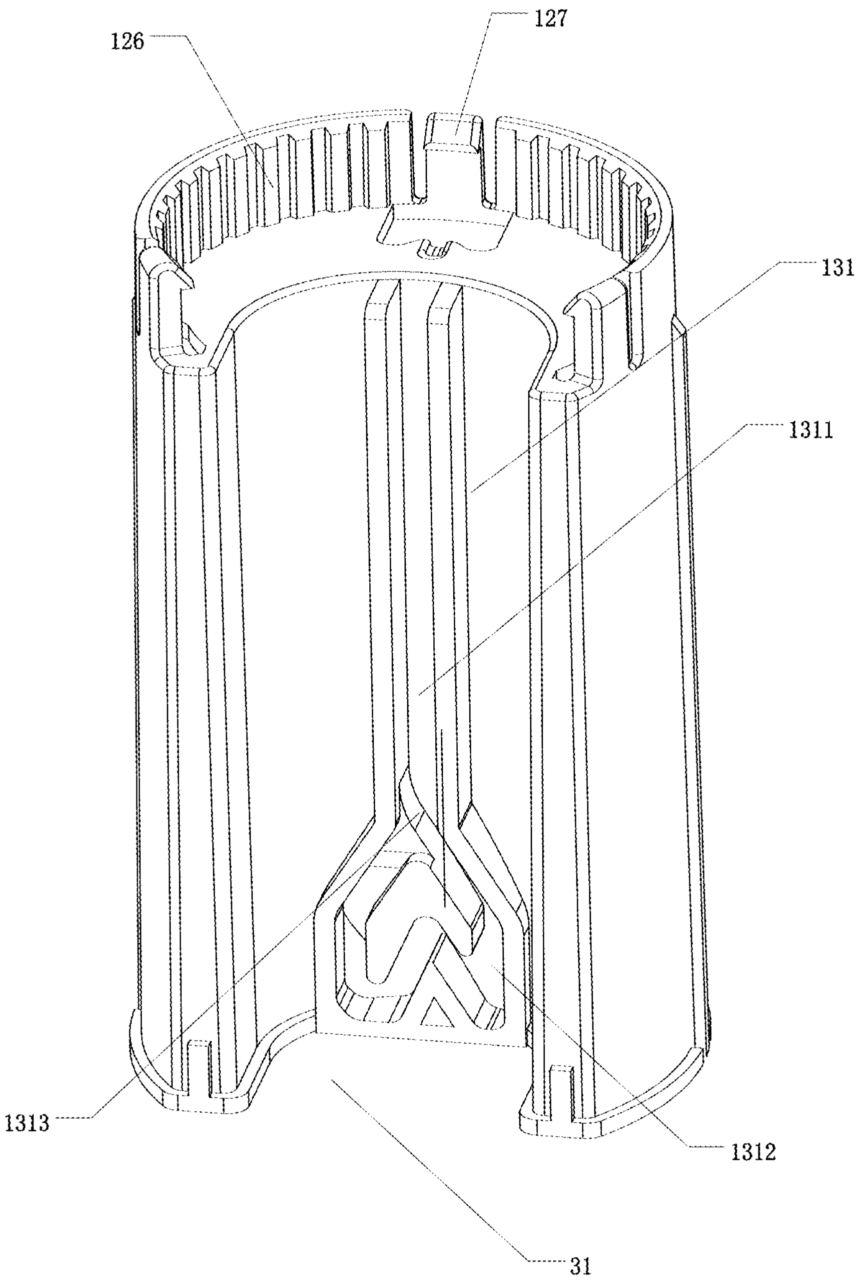
FIG. 4 is a schematic diagram of a guide rail bifurcation step of a first telescopic rod of a detachable telescopic downlight according to one embodiment of the present application.
Figure 5:
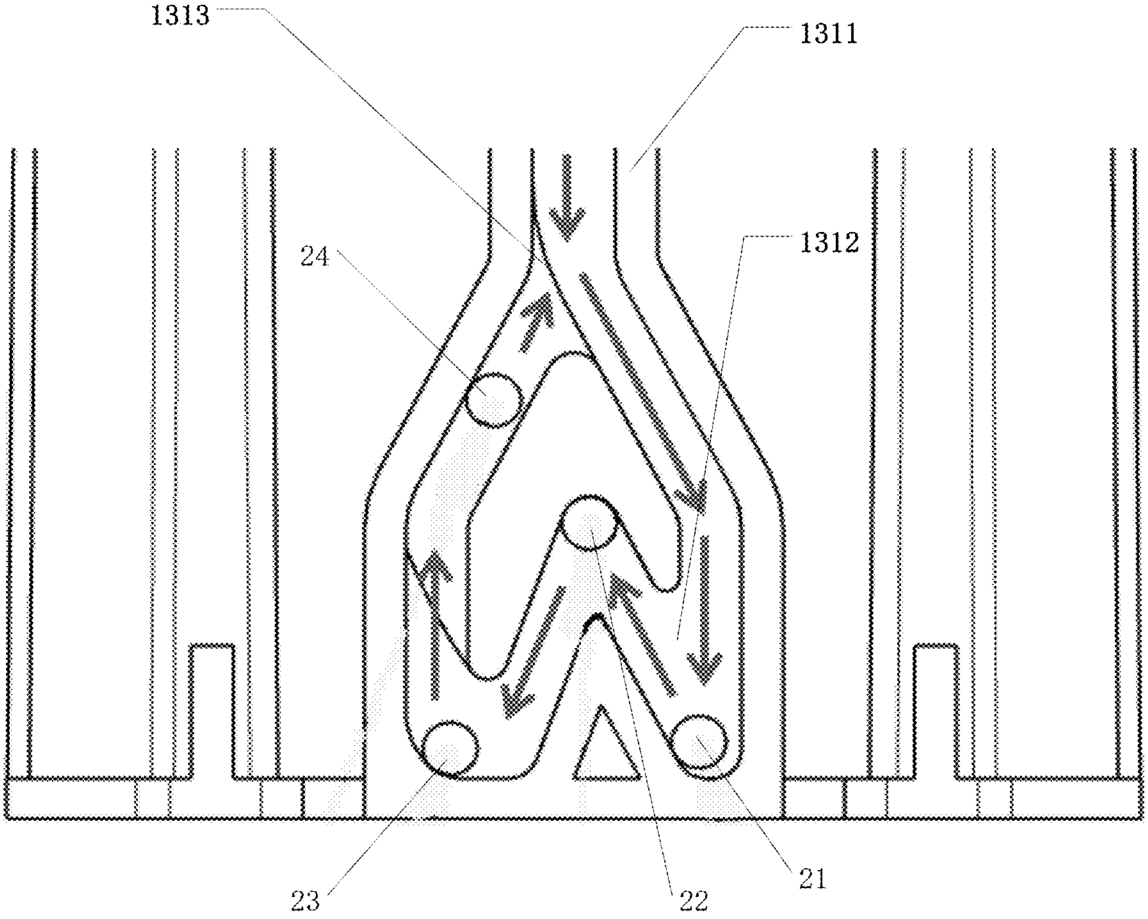
FIG. 5 is a schematic diagram of point positions when a torsion spring slides in a guide rail structure of a first telescopic rod of a detachable telescopic downlight according to one embodiment of the present application.
Figure 6:
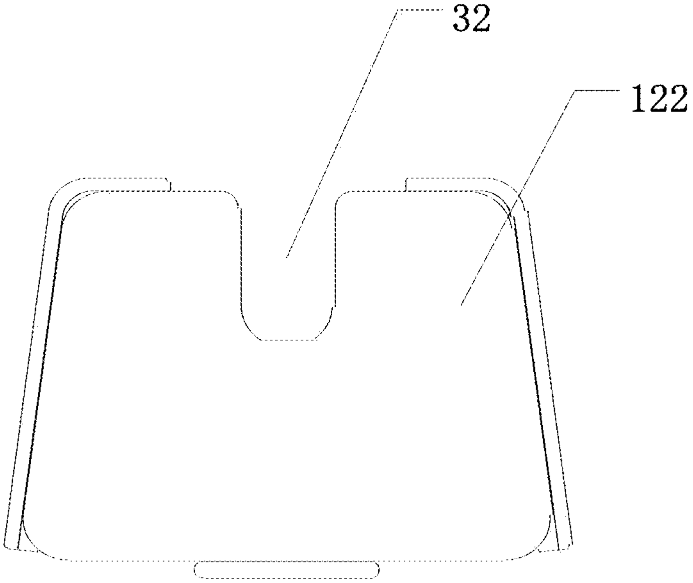
FIG. 6 is a schematic diagram of a trapezoidal bottom platform of a second telescopic rod of a detachable telescopic downlight according to one embodiment of the present application.

Please refer to FIGS. 3-6. FIG. 3 is a schematic diagram of a guide rail structure of a first telescopic rod of a detachable telescopic downlight according to one embodiment of the present application. FIG. 4 is a schematic diagram of a guide rail bifurcation step of a first telescopic rod of a detachable telescopic downlight according to one embodiment of the present application. FIG. 5 is a schematic diagram of point positions when a torsion spring slides in a guide rail structure of a first telescopic rod of a detachable telescopic downlight according to one embodiment of the present application. FIG. 6 is a schematic diagram of a trapezoidal bottom platform of a second telescopic rod of a detachable telescopic downlight according to one embodiment of the present application.

In one embodiment, the telescopic fixing structure 12 includes a first telescopic rod 121, a second telescopic rod 122, a bottom plate 123, a tension spring 124, and a torsion spring 125. The torsion spring 125 is provided with a first spring arm 1251 and a second spring arm 1252.

The second telescopic rod 122 is a hollow structure. A sidewall of the second telescopic rod 122 forms a guide slide slot. The first telescopic rod 121 is slidably sleeved in the second telescopic rod 122 along the guide slide slot. The bottom plate 123 can be integrally or detachably disposed on a bottom of the second telescopic rod 122. A first end of the tension spring 124 is fixed to the first telescopic rod 121, and a second end of the tension spring 124 is fixed to the bottom plate 123. The first spring arm 1251 of the torsion spring 125 is fixedly disposed on an inner sidewall of the second telescopic rod 122, and the second spring arm 1252 of the torsion spring 125 is slidably disposed on a guide rail structure 13 in the first telescopic rod 121.

Specifically, the second telescopic rod 122 is sleeved on an outer side of the first telescopic rod 121, and the second telescopic rod 122 and the first telescopic rod 121 can move up and down relative to each other. The bottom plate 123 is fixed to the bottom of the second telescopic rod 122. Two ends of the tension spring 124 are fixed on the first telescopic rod 121 and the bottom plate 123, respectively. A first end of the torsion spring 125 is fixedly connected to the inner sidewall of the second telescopic rod 122, and a second end of the torsion spring 125 can slide in the guide rail structure 13 of the second telescopic rod 122.

Please continue to refer to FIGS. 3-5.

In one embodiment, the guide rail structure 13 is disposed on an inner wall of the first telescopic rod 121. The guide rail structure 13 includes a guide rail slot 131 and the second spring arm 1252. The guide rail slot 131 includes a vertical guide slot 1311 and a locking slot 1312 connected to the vertical guide slot 1311.

The locking slot 1312 includes at least one locking position. The second spring arm 1252 can enter the locking position under the action of an external force and remain in the locking position after the external force is removed to adjust the overall height of the telescopic fixing structure 12.

The guide rail structure 13 further includes a bifurcation step 1313. The bifurcation step 1313 is disposed at a connection between the guide slot 1311 and the locking slot 1312 to allow the torsion spring 125 to slide along the guide rail slot 131.

Specifically, the first telescopic rod 121 is sleeved in the second telescopic rod 122 and can move up and down. Adjustment actions such as sliding locking and unlocking can be performed based on an elastic deformation change of the tension spring 124.

Please continue to refer to FIG. 5.

In this embodiment, preferably, one locking position is provided.

Specifically, the process of a tensile fixation movement is as follows: when the first telescopic rod 121 and the second telescopic rod 122 move apart, the tension spring 124 is stretched and provides a reaction force in a direction of shortening the stroke. During a gradual pulling process between the first telescopic rod 121 and the second telescopic rod 122, the torsion spring 125 slides along the guide slot 1311 of the first telescopic rod 121 until it reaches a bifurcation. As the bifurcation step 1313 is provided on a left side of the bifurcation, the second spring arm 1252 of the torsion spring 125 can only slide downward along the guide slot 1311 on a right side. When the first telescopic rod 121 and the second telescopic rod 122 are stretched to a fully extended position, the second spring arm 1252 of the torsion spring 125 reaches a first point position 21 of the guide rail slot 131 of the first telescopic rod 121. At this time, due to the elastic force of the tension spring 124, which shortens the first telescopic rod 121 and the second telescopic rod 122, and the deflection force of the torsion spring 125, the second spring arm 1252 of the torsion spring 125 slides from the first point position 21 to a second point position 22 along a left sidewall of the first point position 21. A movement, compressed by the tension spring 124, is limited by the torsion spring 125, and the second spring arm 1252 is locked in the locking position, thereby achieving locking in an extended state.

Meanwhile, the first telescopic rod 121 and the second telescopic rod 122 are in a stretched and locked state.

The process of a retraction release movement is as follows: as the second spring arm 1252 of the torsion spring 125 is in the locked position, the first telescopic rod 121 and the second telescopic rod 122 are re-stretched to the fully extended position, that is, the second spring arm 1252 of the torsion spring 125 moves along the guide rail from the second point position 22 to a third point position 23 under the deflection force of the torsion spring 125. In this case, due to the elastic force of the tension spring 124, the first telescopic rod 121 and the second telescopic rod 122 are shortened, and the torsion spring 125 is simultaneously pulled to a fourth point position 24 on a side extension of the guide rail, then slides into the vertical guide rail to achieve reset.

That is to say, when the first telescopic rod 121 and the second telescopic rod 122 move apart, the tension spring 124 is stretched and elastically deformed. During the gradual stretching of the first telescopic rod 121 and the second telescopic rod 122, the second spring arm 1252 of the torsion spring 125 slides downward along the guide slot 1311 of the first telescopic rod 121 until it reaches the bifurcation. Then, due to the bifurcation step 1313 is provided on the left side of the bifurcation, the second spring arm 1252 continues to slide downward along the guide slot 1311 on the right side until it reaches the first point position 21. At this time, the elastic deformation of the tension spring 124 has reached the fully extended position. Next, as the external force is removed, the second spring arm 1252 slides to the second point position 22, and thus, the first telescopic rod 121 and the second telescopic rod 122 are in the stretched and locked state. In this state, the whole downlight is rotated to be fixed in a light source housing through a threaded structure of the lamp holder 112, thereby realizing a mutual fixed connection between the lamp holder 112 and the light source housing.

Then, the first telescopic rod 121 and the second telescopic rod 122 are re-stretched to the fully extended position to unlock. At this time, the second spring arm 1252 of the torsion spring 125 slides from the second point position 22 to the third point position 23 along the guide rail slot 131 under the torsion force of the torsion spring 125. Meanwhile, due to the elastic force of the tension spring 124, the first telescopic rod 121 and the second telescopic rod 122 are shortened (i.e., the first telescopic rod 121 and the second telescopic rod 122 move towards each other), and the torsion spring 125 is simultaneously pulled to the fourth point position 24 on the side extension of the guide rail. The second spring arm 1252, due to a restoring force of the elastic deformation, slides through the bifurcation step 1313 into the vertical guide rail to complete the reset. At this time, the lamp panel 111 is limited by a ceiling, and the installation of the entire downlight is completed.

In this embodiment, since the tension spring 124 can continuously provide restoring force, the downlight fits snugly against the wall without any gap once installed, thus avoiding issues such as slippage or shifting that may occur due to the friction-based installation in the prior art, providing greater stability. In addition, the first telescopic rod 121 and the second telescopic rod 122 can be locked in the fully extended position, and unlocking can be achieved by pushing the torsion spring in a direction of increasing the stroke until it disengages from the locking position.

It should be noted that the telescopic fixing structure of the present application can achieve a vertical telescopic, stepless adjustment, fixation at the fully extended position with limiting by the torsion spring 125, the structure and form of the guide rail structure 13 in the first telescopic rod 121, automatic rebound, and other functions.

Please refer to FIG. 4 and FIG. 6.

In one embodiment, a first notch 31 is provided on sidewalls of the first telescopic rod 121 and the second telescopic rod in the vertical direction, so that horizontal cross sections of the sidewalls are C-shaped. A bottom platform of the second telescopic rod 122 has a trapezoidal shape. A second notch 32 is provided on the trapezoidal bottom platform, and the second notch 32 of the second telescopic rod is connected to the first notch 31 for the passage of electric wires.

Specifically, the first telescopic rod 121 and the second telescopic rod 122 are preferably C-shaped structures, and the first spring arm 1251 of the torsion spring 125 is fixed on the inner sidewall of the second telescopic rod 122. Wires between the lamp holder 112 and the lamp panel 111 can be rotated at the first notch 31 of the C-shaped structures to avoid interference, wire tangling, abrasion, and damage, while also enhancing aesthetics. Meanwhile, the bottom platform of the second telescopic rod 122 has a trapezoidal shape to ensure that the first notch 31 of the C-shaped structures faces the wire during installation, thereby ensuring proper installation and electrical safety.

In one embodiment, a first toothed structure 126 and a first buckle 127 are provided on an inner sidewall of a top of the telescopic fixing structure 12. The first toothed structure 126 and the first buckle 127 are respectively connected to a second toothed structure 128 and a second buckle 129 on an outer edge of the lamp holder 112.

Specifically, an upper portion of the first telescopic rod 121 is provided with the first toothed structure 126 that matches the second toothed structure 128 on the outer edge of the lamp holder 112 to ensure that the downlight can be properly installed.

In one embodiment, a threaded structure is disposed on the top of the telescopic fixing structure 12 to ensure the lamp holder can be screwed into the telescopic fixing structure 12.

In this embodiment, a notch for snap-fitting the torsion spring of the existing product is retained on an upper surface of the lamp panel 111, so that users can choose the installation method.

The present application adopts a detachable structure of the downlight body and the telescopic structure, which can accommodate more products in the same packaging volume and reduce packaging costs. Moreover, the installation process of the structure is simple and more convenient, avoiding the potential risk of injury.

It should be noted that the downlight of the present application can achieve a free adjustment with stepless telescoping to ensure that the downlight can be applied to light housings of different depths. The installation structure of the present application is located at a center position and can be suitable for light housings of various diameters, such as 4 inches, 5 inches, 6 inches, etc.

The installation process of each component of the detachable telescopic downlight is explained as an example below.

First, the first telescopic rod is sleeved in the second telescopic rod from the top. Then, the first end of the tension spring is hooked to the first telescopic rod, and the second end of the tension spring is hooked to the bottom plate. Next, the bottom plate is connected to the second telescopic rod by threads from the bottom. Finally, the torsion spring is connected to a cylinder of the second telescopic rod by screws, the second of the torsion spring is rotatably provided in the guide slot of the first telescopic rod, and the first end of the torsion spring is fixed to the inner sidewall of the second telescopic rod, thereby completing the mounting process.

To sum up, the detachable telescopic downlight of the present application adopts a detachable structural design of the downlight body and the telescopic structure. The detachable structure downlight can achieve a free adjustment with stepless telescoping to ensure that the downlight can be applied to light housings of different depths. Meanwhile, it also avoids issues such as slippage or shifting, which may occur due to the friction-based installation, and provides improved stability. The present application not only solves the problem where the current downlight installation method relies on a torsion spring supported on the side wall of the light housing, which leads to installation failure due to the sidewall torsion spring limiting assembly detaching from the light housing, but also addresses the installation difficulties and the risk of injury present in current installation methods. Meanwhile, the structure and components of the present application are highly versatile, with a wide range of applications and significant practical value.

The embodiments described above serve merely as illustrative examples of the principles and effects of the present application, and are not intended to serve as limitations on the present application. People skilled in the art may modify or alter these embodiments without departing from the spirit and scope of the present application. Therefore, any equivalent modifications or alterations made by those skilled in the art, which are consistent with the spirit and technical concepts disclosed in the present disclosure, shall still fall within the scope of the claims of the present application.

The invention claimed is:

1. A detachable telescopic downlight, comprising a downlight body and a telescopic fixing structure, wherein:

the downlight body includes a lamp panel and a lamp holder;

wherein a top of the lamp panel is provided with a slot, and a bottom of the telescopic fixing structure is detachably connected to the slot;

wherein the lamp holder is detachably mounted on a top end of the telescopic fixing structure;

wherein a limiting block is provided on the top of the lamp panel;

wherein a slide buckle is provided on the bottom of the telescopic fixing structure, and the slide buckle is configured to be inserted into an entrance of the slot and to move in the slot along a first horizontal direction;

when the telescopic fixing structure slides into a slot bottom plate, the telescopic fixing structure is locked to the limiting block to prevent the telescopic fixing structure from moving out of the slot in a direction opposite to the first horizontal direction.

2. The downlight according to claim 1, wherein the telescopic fixing structure comprises a first telescopic rod, a second telescopic rod, a bottom plate, a tension spring, and a torsion spring;

wherein the second telescopic rod is a hollow structure, and a sidewall of the second telescopic rod forms a guide slide slot;

wherein the first telescopic rod is slidably sleeved in the second telescopic rod along the guide slide slot;

wherein the bottom plate is integrally or detachably disposed on a bottom of the second telescopic rod;

wherein a first end of the tension spring is fixed to the first telescopic rod, and a second end of the tension spring is fixed to the bottom plate;

wherein a first spring arm of the torsion spring is fixedly disposed on an inner sidewall of the second telescopic rod, and a second spring arm of the torsion spring is slidably disposed on a guide rail structure in the first telescopic rod.

3. The downlight according to claim 2, wherein the guide rail structure is provided on an inner wall of the first telescopic rod;

wherein the guide rail structure includes a guide rail slot and the second spring arm, and the guide rail slot includes a vertical guide slot and a locking slot connected to the vertical guide slot;

wherein the locking slot includes at least one locking position;

wherein the second spring arm can enter the locking position under the action of an external force and remain in the locking position after the external force is removed to adjust an overall height of the telescopic fixing structure.

4. The downlight according to claim 3, wherein the guide rail structure further includes a bifurcation step;

wherein the bifurcation step is disposed at a connection between the guide slot and the locking slot to allow the torsion spring to slide along the guide rail slot.

5. The downlight according to claim 2, wherein a first notch is provided on sidewalls of the first telescopic rod and the second telescopic rod in a vertical direction, so that horizontal cross sections of the sidewalls are C-shaped;

wherein a bottom platform of the second telescopic rod has a trapezoidal shape.

6. The downlight according to claim 5, wherein:

a second notch is provided on the trapezoidal bottom platform, and the second notch of the second telescopic rod is connected to the first notch for the passage of electric wires.

7. The downlight according to claim 1, wherein a first toothed structure and a first buckle are provided on an inner sidewall of a top of the telescopic fixing structure;

wherein the first toothed structure and the first buckle are respectively connected to a second toothed structure and a second buckle on an outer edge of the lamp holder.

8. The downlight according to claim 1, wherein a threaded structure is disposed on the top of the telescopic fixing structure to ensure that the lamp holder can be screwed into the telescopic fixing structure.

* * * * *